US010209961B2

(12) United States Patent
Teglia

(10) Patent No.: US 10,209,961 B2
(45) Date of Patent: Feb. 19, 2019

(54) VERIFICATION OF THE SENSITIVITY OF AN ELECTRONIC CIRCUIT EXECUTING A MODULAR EXPONENTIATION CALCULATION

(71) Applicant: STMicroelectronics (Rousset) SAS, Rousset (FR)

(72) Inventor: Yannick Teglia, Belcodene (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 317 days.

(21) Appl. No.: 15/056,586

(22) Filed: Feb. 29, 2016

(65) Prior Publication Data
US 2017/0060535 A1  Mar. 2, 2017

(30) Foreign Application Priority Data

Aug. 27, 2015  (FR) ...................................... 15 57976

(51) Int. Cl.
*G06F 7/72* (2006.01)
*H04L 9/06* (2006.01)
*H04L 9/00* (2006.01)

(52) U.S. Cl.
CPC .............. *G06F 7/723* (2013.01); *H04L 9/004* (2013.01); *H04L 9/06* (2013.01); *G06F 2207/7219* (2013.01)

(58) Field of Classification Search
CPC ... G06F 7/723; G06F 2207/7219; H04L 9/06; H04L 9/004
See application file for complete search history.

(56) References Cited

U.S. PATENT DOCUMENTS 5,448,639 A * 9/1995 Arazi ...................... G06F 7/721
                                                                380/30
5,742,534 A * 4/1998 Monier ................... G06F 7/727
                                                                708/492

(Continued)

FOREIGN PATENT DOCUMENTS

FR          2843507 A1      2/2004

OTHER PUBLICATIONS

Kim et al., "Safe-Error Attack on SPA-FA Resistant Exponentiations Using a HW Modular Multiplier," *Information Security and Cryptology ICISC Lecture Notes in Computer Science (4817)*: 8 pages, 2007.

(Continued)

*Primary Examiner* — Joseph P Hirl
*Assistant Examiner* — Thomas A Gyorfi
(74) *Attorney, Agent, or Firm* — Seed IP Law Group LLP

(57) ABSTRACT

A method of verifying the sensitivity of an electronic circuit executing a modular exponentiation calculation in a first register and a second register, successively including, for each bit of the exponent: a first step of multiplying the content of one of the registers, selected from among the first register and the second register according to the state of the bit of the exponent, by the content of the other one of the first and second registers, placing the result in said one of the registers; a second step of squaring the content of said other one of the registers by placing the result in this other register, wherein the content of that of the first and second registers which contains the multiplier of the operation of the first step is disturbed, for each bit of the exponent, during the execution of the first step.

25 Claims, 4 Drawing Sheets

(56) References Cited

U.S. PATENT DOCUMENTS

| | | | | |
|---|---|---|---|---|
| 6,317,769 B1* | 11/2001 | Kobayashi | ............. | G06F 7/723 |
| | | | | 708/491 |
| 8,588,407 B2* | 11/2013 | Liardet | .................. | G06F 7/723 |
| | | | | 380/28 |
| 2007/0162534 A1* | 7/2007 | Liardet | .................. | G06F 7/723 |
| | | | | 708/446 |
| 2008/0147768 A1* | 6/2008 | Gopal | .................... | G06F 7/723 |
| | | | | 708/491 |
| 2009/0175455 A1* | 7/2009 | Joye | ........................ | G06F 7/723 |
| | | | | 380/278 |
| 2011/0311041 A1* | 12/2011 | Murray | .................. | H04L 9/002 |
| | | | | 380/28 |
| 2012/0159189 A1* | 6/2012 | Joye | ........................ | G06F 7/723 |
| | | | | 713/189 |
| 2012/0278375 A1* | 11/2012 | Belenky | ................. | G06F 7/723 |
| | | | | 708/603 |

OTHER PUBLICATIONS

Joye et al., "The Montgomery Powering Ladder," *CHES 2002, LNCS 2523*:291-302, 2003.

\* cited by examiner

VERIFICATION OF THE SENSITIVITY OF AN ELECTRONIC CIRCUIT EXECUTING A MODULAR EXPONENTIATION CALCULATION

BACKGROUND

Technical Field

The present disclosure generally relates to electronic circuits and, more specifically, to circuits executing modular exponentiation operations. The present disclosure more specifically relates to the protection of such a calculation against fault-injection attacks.

Discussion of the Related Art

In many applications, electronic circuits implement algorithms of encryption, authentication, signature calculation, and more generally algorithms manipulating data, called secret data, that is, the access to which is desired to be reserved to certain users or circuits. Among such algorithms, some use modular exponentiation operations including all or part of the secret data.

There exist many methods, called attacks, to attempt discovering or pirating such secret data. Among such attacks, so-called fault injection attacks comprise disturbing the circuit operation at specific times of the execution of the operation. The interpretation of the consequences of such fault injections on the circuit operation or on the provided results gives the pirate information relative to the secret data.

BRIEF SUMMARY

An embodiment facilitates overcoming all or part of the disadvantages of usual methods and circuits for protecting data manipulated by algorithms executing modular exponentiations against fault injection attacks.

In an embodiment, a method of calculation of a modular exponentiation by an electronic circuit facilitates overcoming all or part of the disadvantages of usual methods.

An embodiment provides a method of verifying the sensitivity of an electronic circuit executing a modular exponentiation calculation to a fault injection attack.

An embodiment provides a method of verifying the sensitivity of an electronic circuit executing a modular exponentiation calculation in a first register and a second register, successively comprising, for each bit of the exponent:

a first step of multiplying the content of one of the registers, selected from among the first register and the second register according to the state of the bit of the exponent, by the content of the other one of the first and second registers, and placing the result in said one of the registers; and a second step of squaring the content of said other one of the registers, and placing the result in this other register, wherein the content of that of the first and second registers which contains the multiplier of the operation of the first step is disturbed, for each bit of the exponent, during the execution of the first step.

According to an embodiment, the first step is implemented by a Montgomery ladder.

According to an embodiment, the content of the first register is disturbed before each iteration of the first step.

According to an embodiment, the result of the modular exponentiation is contained in said first register.

According to an embodiment, the circuit is considered as sensitive to a fault injection if the result differs between a plurality of executions of the calculation with the same operands.

According to an embodiment, the method comprises the steps of:

initializing the first register to value 1;

initializing the second register to the value of the number to be submitted to the modular exponentiation;

successively, for each bit of the exponent;

if the state of the current bit of the exponent is 1:

multiplying the content of the first register by that of the second register and storing the result in the first register;

squaring the content of the second register and storing the result in the second register; or if the state of the current bit of the exponent is 0:

multiplying the content of the second register by that of the first register and storing the result in the second register;

squaring the content of the first register and storing the result in the first register; and restoring the content of the first register when all the bits of the exponent have been processed.

According to an embodiment, the disturbance is, whatever the state of the bit of the exponent, carried out in the multiplication step.

According to an embodiment, the modular exponentiation is implemented in a RSA algorithm.

An embodiment provides an electronic circuit, which, in operation, implementing one or more of the methods described herein.

In an embodiment, a method comprises: verifying a sensitivity of an electronic circuit executing a modular exponentiation calculation using a first register and a second register, wherein: the executing the modular exponentiation calculation includes, successively for each bit of an exponent of the calculation: multiplying content of one of the registers, selected from among the first register and the second register according to a state of a current bit of the exponent, by content of the other one of the first and second registers, and placing a result of the multiplication in said one of the first and second registers; and squaring content of said other one of the first and second registers and placing a result of the squaring in the other of the first and second registers; and the verifying includes: disturbing, for each bit of the exponent of the calculation, content of at least one of the first and second registers during the multiplying; and determining the sensitivity of the electronic circuit based on disturbed results of the modular exponentiation calculation. In an embodiment, the multiplying is implemented using a Montgomery ladder. In an embodiment, the verifying includes disturbing content of the first register before each multiplication of the multiplying. In an embodiment, a result of the modular exponentiation is contained in said first register. In an embodiment, the electronic circuit is considered as sensitive to a fault injection if the results of the calculation differ between a plurality of executions of the calculation with the same operands. In an embodiment, the executing the modular exponentiation calculation includes: initializing the first register to value 1; initializing the second register to a value of a number to be submitted to the modular exponentiation; successively for each bit of the exponent; if the state of the current bit of the exponent is 1: multiplying content of the first register by that of the second register and storing the result of the multiplying in the first register; squaring content of the second register and storing the result of the squaring in the second register; and if the state of the current bit of the exponent is 0: multiplying content of the second register by that of the first register and storing the result of the multiplying in the second register; squaring content of the first register and storing the result of the squaring in the first register; and outputting the content of the first register when all the bits of the exponent have been processed. In an embodiment, the disturbance is, whatever the state of the bit of the exponent, carried out in the multiplication step. In an embodiment, the modular exponentiation is implemented in a RSA algorithm. In an embodiment, the disturbing content of at least one of the first and second registers during the multiplying comprises disturbing a register storing a multiplier of the multiplying.

In an embodiment, an apparatus comprises: an interface configured to couple to a cryptographic circuit including first and second registers; and control circuitry coupled to the interface, wherein, in operation, the control circuitry: generates signals to cause the cryptographic circuit to execute a modular exponentiation calculation, the executing the modular exponentiation calculation including, successively for each bit of an exponent of the calculation: multiplying content of one of the first and second registers, selected from among the first register and the second register according to a state of a current bit of the exponent, by content of the other one of the first and second registers, and placing a result of the multiplication in said one of the first and second registers; and squaring content of said other one of the first and second registers and placing a result of the squaring in the other of the first and second registers; and generates signals to disturb, for each bit of the exponent of the calculation, content of at least one of the first and second registers during the multiplying of the modular exponentiation calculation. In an embodiment, wherein the control circuitry, in operation, extracts at least one bit of the exponent of the calculation based on results of the disturbed modular exponentiation calculation. In an embodiment, the disturbing comprises a fault injection attack. In an embodiment, the control circuitry, in operation, verifies a sensitivity of the cryptographic circuit to fault injection attacks based on results of the disturbed modular exponentiation calculation. In an embodiment, the cryptographic circuit is considered as sensitive to a fault injection if the results of the calculation differ between a plurality of executions of the calculation with the same operands. In an embodiment, the multiplying is implemented using a Montgomery ladder. In an embodiment, the disturbing includes disturbing content of the first register before each multiplication of the multiplying. In an embodiment, a result of the modular exponentiation is contained in said first register. In an embodiment, the executing the modular exponentiation calculation includes: initializing the first register to value 1; initializing the second register to a value of a number to be submitted to the modular exponentiation; successively for each bit of the exponent; if the state of the current bit of the exponent is 1: multiplying content of the first register by that of the second register and storing the result of the multiplying in the first register; squaring content of the second register and storing the result of the squaring in the second register; and if the state of the current bit of the exponent is 0: multiplying content of the second register by that of the first register and storing the result of the multiplying in the second register; squaring content of the first register and storing the result of the squaring in the first register; and outputting the content of the first register when all the bits of the exponent have been processed. In an embodiment, the modular exponentiation is implemented in a RSA algorithm. In an embodiment, the disturbing content of at least one of the first and second registers during the multiplying comprises disturbing a register of the first and second registers storing a multiplier of the multiplying.

In an embodiment, a method comprises: executing, using a cryptographic circuit including first and second registers, a modular exponentiation calculation, the executing the modular exponentiation calculation including, successively for each bit of an exponent of the calculation: multiplying content of one of the first and second registers, selected from among the first register and the second register according to a state of a current bit of the exponent, by content of the other one of the first and second registers, and placing a result of the multiplication in said one of the first and second registers; and squaring content of said other one of the first and second registers and placing a result of the squaring in the other of the first and second registers; and injecting, for each bit of the exponent of the calculation, a fault into content of at least one of the first and second registers during the multiplying of the modular exponentiation calculation. In an embodiment, the method comprises extracting at least one bit of the exponent of the calculation based on results of the modular exponentiation calculation. In an embodiment, the method comprises verifying a sensitivity of the cryptographic circuit to fault injection attacks based on results of the modular exponentiation calculation. In an embodiment, the injecting a fault includes disturbing content of the first register before each multiplication of the multiplying. In an embodiment, the injecting a fault comprises disturbing a register of the first and second registers storing a multiplier of the multiplying.

DETAILED DESCRIPTION

Figure 1:
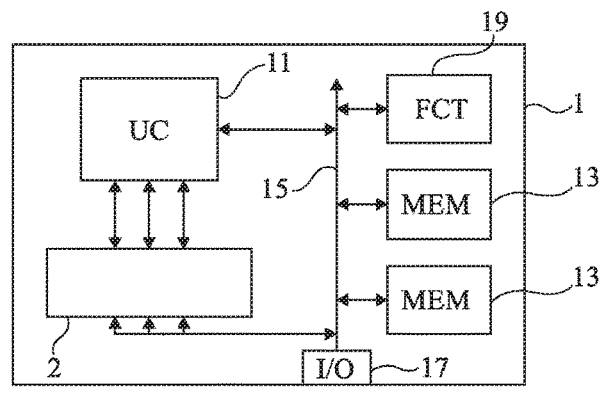
FIG. 1 schematically shows an embodiment of an electronic circuit.

The same elements have been designated with the same reference numerals in the different drawings, unless the context indicates otherwise. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the applications of the executed calculations or of the circuits executing them have not been detailed, the described embodiments being compatible with usual applications. When reference is made to terms "about", "approximately", or "in the order of", this means to within 10%, in some embodiments to within 5%.

Modular exponentiation operations can be found in many encryption algorithms, among which, for example, the algorithms known as RSA, DSA, Diffie-Hellman, etc.

A modular exponentiation comprises calculating result c of the exponentiation of a number b by an integer e (exponent) modulo n, that is, applying formula:

$$c=b^e \pmod{n}.$$

Most often:

number b represents the number (or an information representative of the number) which is desired to be encrypted, authenticated, signed, etc.; and exponent e and modulo n (pair (e, n)) represent the encryption, verification, signature, etc., key (or information representative of the key).

In the example of application to RSA encryption, the encryption key is pair (e, n) and the decryption key is a pair (e', n) where n is the encryption modulo and e' is the decryption exponent.

The calculation of the modular exponentiation by an electronic circuit (a state machine, a processor executing the method in the form of a program, a programmable logic circuit, etc.) is most often performed by applying a so-called square-multiply method.

FIG. 1 very schematically shows an electronic circuit 1 of the type to which the embodiments which will be described apply.

Circuit 1 comprises:

a calculation circuit 11 (UC), for example, a state machine, a microprocessor, a programmable logic circuit, etc., including or using registers 2 arbitrarily shown in FIG. 1 outside of circuit 11;

one or a plurality of volatile and/or non-volatile storage areas 13 (MEM) for storing all or part of the data and keys;

one or a plurality of data, address, and/or control buses 15 between the different elements internal to circuit 1 and an input-output interface 17 (I/O) for communicating with the outside of circuit 1.

Circuit 1 may include various other circuits according to the application, symbolized in FIG. 1 by a block 19 (FCT). For example, block 19 may comprise circuitry (e.g., a controller, etc.) configured to subject the calculation circuit 11 to a power analysis attack, block 19 may comprise circuitry configured to process mobile telephone signals, may comprise circuitry configured to process financial transactions, etc. Block 19 may be external to the circuit 1.

The calculation of a modular exponentiation according to the square-multiply method uses a polynomial decomposition of the calculation.

Figure 2:
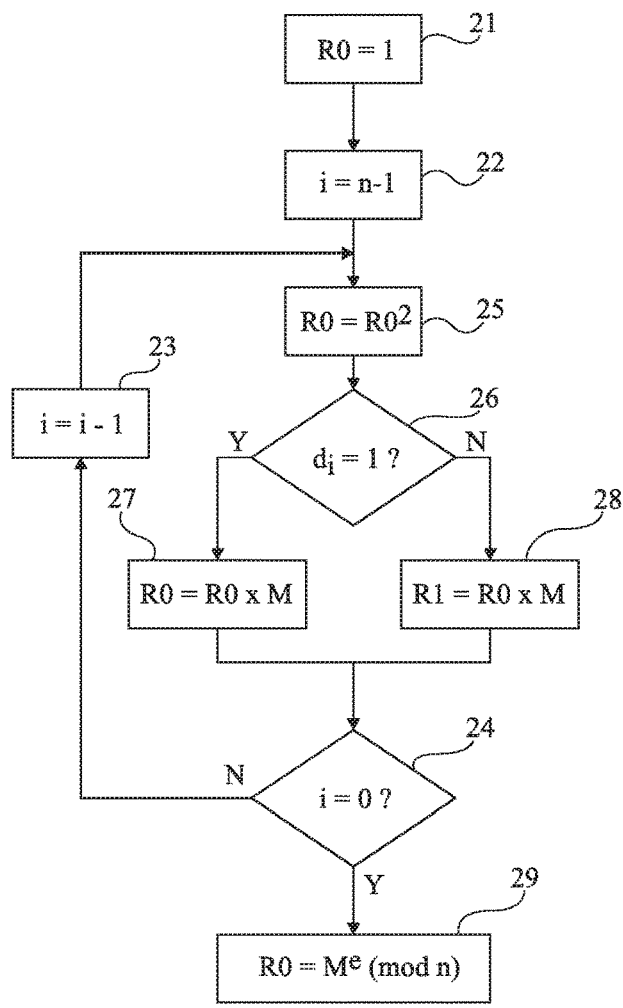
FIG. 2 illustrates in the form of blocks the steps of a calculation by the square-multiply method.

FIG. 2 shows, in the form of blocks, the steps of a calculation by the square-multiply method, including a protection against simple power analysis (SPA) attacks and timing attacks.

The message, for example, number b, to be submitted to the modular exponentiation is loaded into a register of circuit 1, noted M. Exponent e is loaded into another register of circuit 1. Note $d_i$ each bit of exponent e, where i designates the rank ranging from 0 to n−1 (or from 1 to n).

The calculation uses two registers 2, arbitrarily called R0 and R1, where the operations will be performed.

Hereafter, for simplification, the registers and their content will be confounded, that is, when reference is made to operations on the registers, this means on the content thereof.

At a first step (block 21), register R0 is initialized to 1 (R0=1).

A loop calculation on the bits of exponent e is then started. For example, a counter i is initialized to n−1 (block 22, i=n−1) and is decremented by 1 (block 23, i=i−1) each time a bit $d_i$ of the exponent is processed as long as not all the bits have been processed (block 24, i=0?).

For each iteration, that is, for each bit $d_i$, it is started (block 25, R0=R0²) by squaring the content of R0 and placing the result in register R0. After this, a test is performed (block 26, $d_i$=1?) on the value of the exponent bit. If current bit $d_i$ is 1 (output Y of block 26), the content of register R0 is multiplied by the content of register M (block 27, R0=R0*M) and the result is placed in register R0. If current bit $d_i$ is 0 (output N of block 26), a masking operation, useless for the actual calculation, is carried out by placing the result of the multiplication of the content of register R0 by the content of register M in register R1 (block 28, R1=R0*M).

As long as not all the bits of the exponent have been processed (output N of block 24), counter i is decremented and it is returned to step 25. Once all the exponent bits have been processed (output Y of block 24), register R0 contains the result of the modular exponentiation (block 29, R0=$M^e$ (mod n)), that is, value c=$b^e$ (mod n).

The calculation illustrated in FIG. 2 may also be written as follows:

R0=1 (step 21)
For i=n−1 to 0 (block 22, output N of block 24, block 23):
R0=R0² or R0*R0 (block 25)
If $d_i$=1 (output Y of block 26)
R0=R0*M (block 27)
Otherwise (output N of block 26)
R1=R0*M (block 28)
End of loop (output Y of block 24)
Return R0 (block 29).

Step 28, which is not taken into account in the result of the calculation, enables to protect the calculation against simple power analysis (SPA) attacks of the circuit by executing the same number of calculations and the same type of calculation whatever the state of the exponent bit.

However, certain fault injection attacks appear to be efficient against the calculation of FIG. 2. In particular, it is now possible to focus an attack on a specific calculation step.

For example, by injecting a fault at the time of the step of multiplication R0*M, that is, by disturbing the result of this step (by changing the value of at least one bit), if the exponent bit is at 1, this will have an effect on the result. If, however, the exponent bit is 0, since the faulty result is stored in register R1 which has no effect on the final result (final value of register R0), the latter is not modified. Accordingly, according to whether the final result is affected or not, the attacker can deduce the state of the exponent bit.

This type of attack is known as "C-Safe Error Attack".

To counter this type of attack, it has already been provided to use the content of registers R0 and R1 in the final result. Such a technique comprises executing the following calculation:

R0=1
R1=M
For i=n−1 to 0:
If $d_i$=1
R0=R0*R1
R1=R1²
Otherwise
R1=R0*R1
R0=R0²
End of loop
Return R0.

Thus, the final result is always modified in case of an attack on operation R0*R1.

However, a weakness of this method has been highlighted in an attack known as "M-Safe Error Attack". Such an attack comprises focusing the attack on the multiplier (in the above example, R1) during multiplication R0*R1.

This attack uses the way in which multiplications are carried out in the electronic circuit. A technique called "Montgomery Ladder" is generally used.

Figure 3:
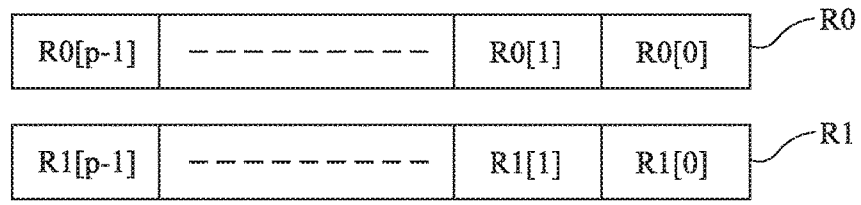
FIG. 3 illustrates an example of content of two registers used in the calculation.

FIG. 3 shows, in the form of blocks, an example of registers R0 and R1 and the respective contents thereof Each register comprises a number p of bits, respectively R0[p−1], R0[2], R0[1], R0[0] and R1[p−1], . . . , R1[2], R1[1], R1[0].

Multiplication operation R0*R1 comprises successively multiplying each word (of at least one bit) of first term R0 (the multiplicand) by all the words (of at least one bit) individually of second term R1 (the multiplier) in a first register and cumulating the results for each word of the first term in another register.

Figure 4:
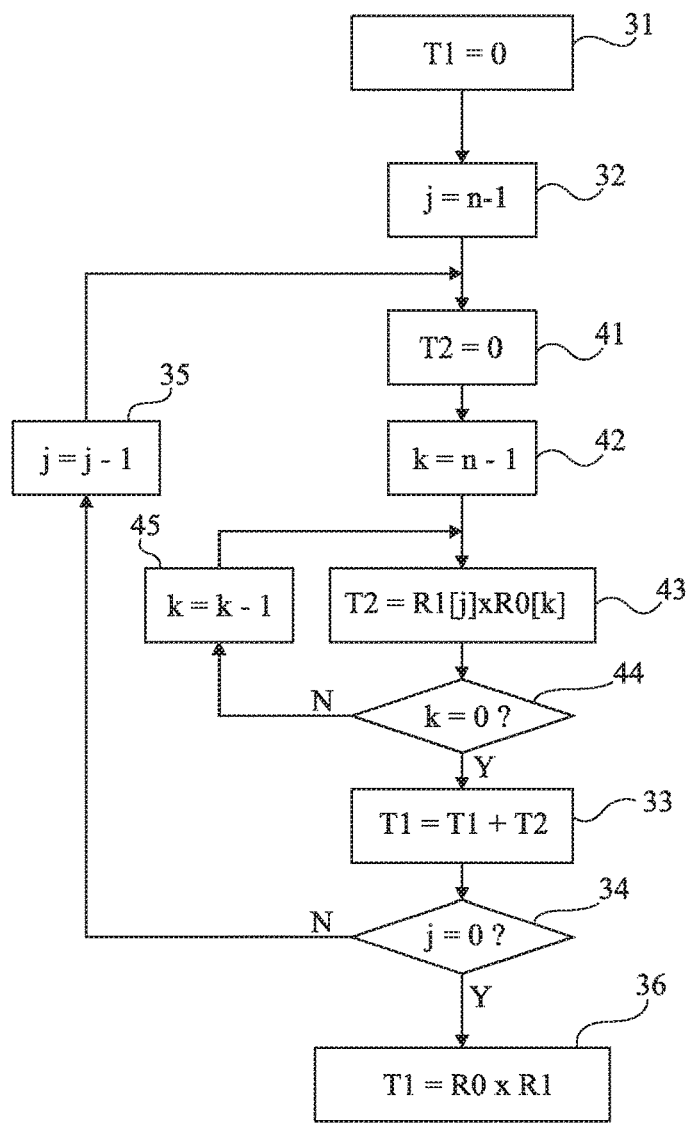
FIG. 4 illustrates in the form of a block diagram the steps of a multiplication performed in a Montgomery ladder.

FIG. 4 illustrates, in the form of a block diagram, the steps of such a multiplication. For simplification, one-bit words are assumed hereafter but all that is written transposes to a word granularity.

A register T1 is first initialized to 0 (block 31, T1=0). Then, for each bit of register R1, (block 41, T2=0) a register T2 of a bit is initialized and the current bit R1[j] of register R1 is successively multiplied by all the bits R0[k] of register R0.

For example, a first counter j is initialized with value n−1 (block 32, j=n−1). For each value of j, register T2 is initialized to 0 (block 41). Then, a second counter k is initialized with value n−1 (block 42, k=n−1). Current bit R0[k] is multiplied by the value of bit R1[j] and the result is stored in register T2 (block 43, T2=R1[j]*R0[k]). As long as not all the bits of register R0 have been processed (output N of block 44, k=0?), that is, as long as counter k has not reached value 0, counter k is decremented (block 45, k=k−1) and it is returned to step 43 to overwrite the content of register T2 with the new result. Once all the bits of register R0 have been processed (output Y of block 44), the content of register T2 is added to the content of register T1 (block 33, T1=T1+T2) and the result is cumulated in register T1. Steps 41 to 45 are repeated for all the bits of register R1. As long as not all the bits of register R1 have been processed (output N of block 34, j=0?) that is, as long as counter j has not reached value 0, counter j is decremented (block 35, j=j−1) and it is returned to step 41. Once all the bits of register R1 have been processed (output Y of block 34), the multiplication is over and register T1 contains (block 36, T1=R0*R1) result R0*R1.

The calculation illustrated in FIG. 4 may also be written as follows:

T1=0 (step 31)
For j=n−1 to 0 (steps 32, 34 (output N), 35):
T2=0 (step 41)
For k=k−1 to 0 (steps 42, 44 (output N), 45):
T2=R1[j]*R0[k] (step 43)
End of loop (output Y of block 44)
T1=T1+T2 (step 33)
End of loop (output Y of block 34)
Return to T1 (step 36).

According to the state of the bit ($d_i$) of the exponent, the value of T1 as a result of multiplication R0*R1 is either returned into register R0 ($d_i$=1), or into register R1 ($d_i$=0).

The M-Safe Error attack comprises directing the attack on multiplication step 43, that is, on one of bits R1[j] during operation 43. By disturbing this bit, the value of register T2 is disturbed, and thus that of register T1. According to the state of bit $d_i$ of the exponent, the content of register T1 can be found in register R0 or in register R1. If the exponent bit is 1, the error is then propagated to register R0 which conveys the final result. If, however, the exponent bit is 0, the fact of storing the content of register T1 in register R1 will, in certain cases, "delete" the error and the latter will have no effect on the final result. By carrying out the attack on the same bit of the exponent a plurality of times, either the attack affects the result each time, and it can be deduced that the exponent bit is 1, or it only has an influence for part of the attacks, and it can be deduced that the exponent bit is 0.

In some attacks, to make the attack more efficient, at least the last "sub" multiplication is attacked, that is, in the example of FIG. 4, at least the value of bit R1[0] is disturbed.

Further, since the M-Safe Error attack concentrates on the exponent bit, it must be carried out for each bit of the exponent.

A solution to overcome this type of attack is to exchange the first term of the multiplication, that is, to calculate R0=R0*R1 or R1=R1*R0 according to the value of the exponent bit. In this case, whatever the value of the exponent bit, the attack will disturb the final result and thus provides no information. Such a solution is described in article "The Montgomery Powering Ladder" by Marc Joye and Sung-Ming Yen (CHES 2002, LNCS 2523, pp 291-302, 2003).

Figure 5:
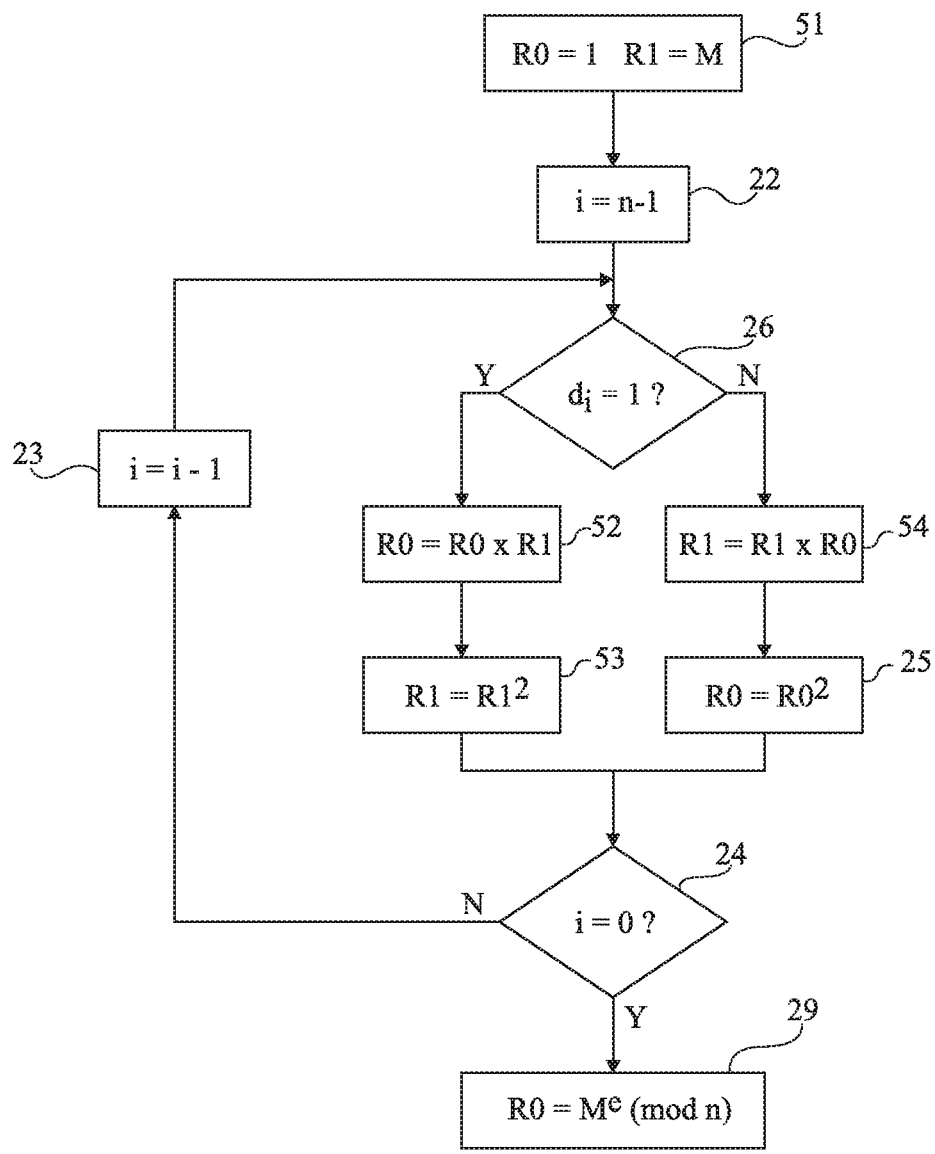
FIG. 5 shows, in the form of blocks, an embodiment of a usual countermeasure.

FIG. 5 shows, in the form of blocks, an implementation mode of such a countermeasure.

In a first step (block 51, R0=1; R1=M), registers R0 and R1 are initialized, respectively with values 1 and M.

A loop calculation on the bits of exponent e is then started. For example, a counter i is initialized to n−1 (block 22, i=n−1) and is decremented by 1 (block 23, i=i−1) each time a bit $d_i$ of the exponent is processed as long as not all the bits have been processed (block 24, i=0?).

At each iteration, a test is performed (block 26, $d_i$=1?) on the value of the exponent bit.

If current bit $d_i$ is 1 (output Y of block 26), the content of register R0 is multiplied by the content of register R1 (block 52, R0=R0*R1) and the result is placed in register R0. Then (block 53, R1=R1$^2$), the content of register R1 is squared and the result is placed in register R1.

If, conversely, current bit $d_i$ is 0 (output N of block 26), the content of register R1 is multiplied by the content of register R0 (block 54, R1=R1*R0) and the result is placed in register R1. Then (block 25, R0=R0$^2$), the content of register R0 is squared and the result is placed in register R0.

At the end (output Y of block 24), register R0 contains (block 29, R0=M$^e$ (mod n)) the final result of the modular exponentiation.

Due to the inversion of the roles between the multiplier and the multiplicand at steps 52 and 54 according to the exponent bit, the attack on the sub-multiplication (step 43, FIG. 4) is capable of always affecting the final result. The M-Safe Error attack thus becomes inoperative.

However, if the attack always targets operand R0 rather than the multiplier, then the execution of the calculation by the electronic circuit becomes vulnerable again. Indeed, from the time when it is possible to target register R0, the vulnerability is located at the level of the last iteration, that is, of last step 52 or 54. Indeed, at this last step, the attack on register R0 will have an effect on the final result if the exponent bit is at state 1 and not in the opposite case. Accordingly, by performing the calculation twice, once with no disturbance and once with a disturbance, the state of the last bit of the exponent can be determined.

A simple way is to attack register R0 at each iteration. However, if the attacker is capable of detecting the iteration sequencing, an attack on the last iteration is sufficient.

To determine which of the two registers 2 plays the role of register R0, it is sufficient to attack the two registers at the end of the multiplication (step 52 or 54). This enables to identify the register which makes the result sensitive to the attack. It is then sufficient to focus the attack on this register during many executions of the calculation to be capable of discovering the secret (the value of the key).

It should be noted that this attack also works if the attack focuses on the value of register R1 during the iteration of the penultimate bit of the exponent.

The above attack is efficient if the key (the exponent value) is not modified by the circuit each time the execution is calculated.

To verify whether the circuit is sensitive to a fault injection according to the above method, it is verified whether the result differs between a plurality of executions of the calculation with the same operands. If the result is positive, the circuit is sensitive.

The inventor provides a countermeasure to such an attack by taking advantage of the fact that the value of exponent e remains the same for many iterations. This is in practice true and this generates the above-mentioned weakness.

Figure 6:
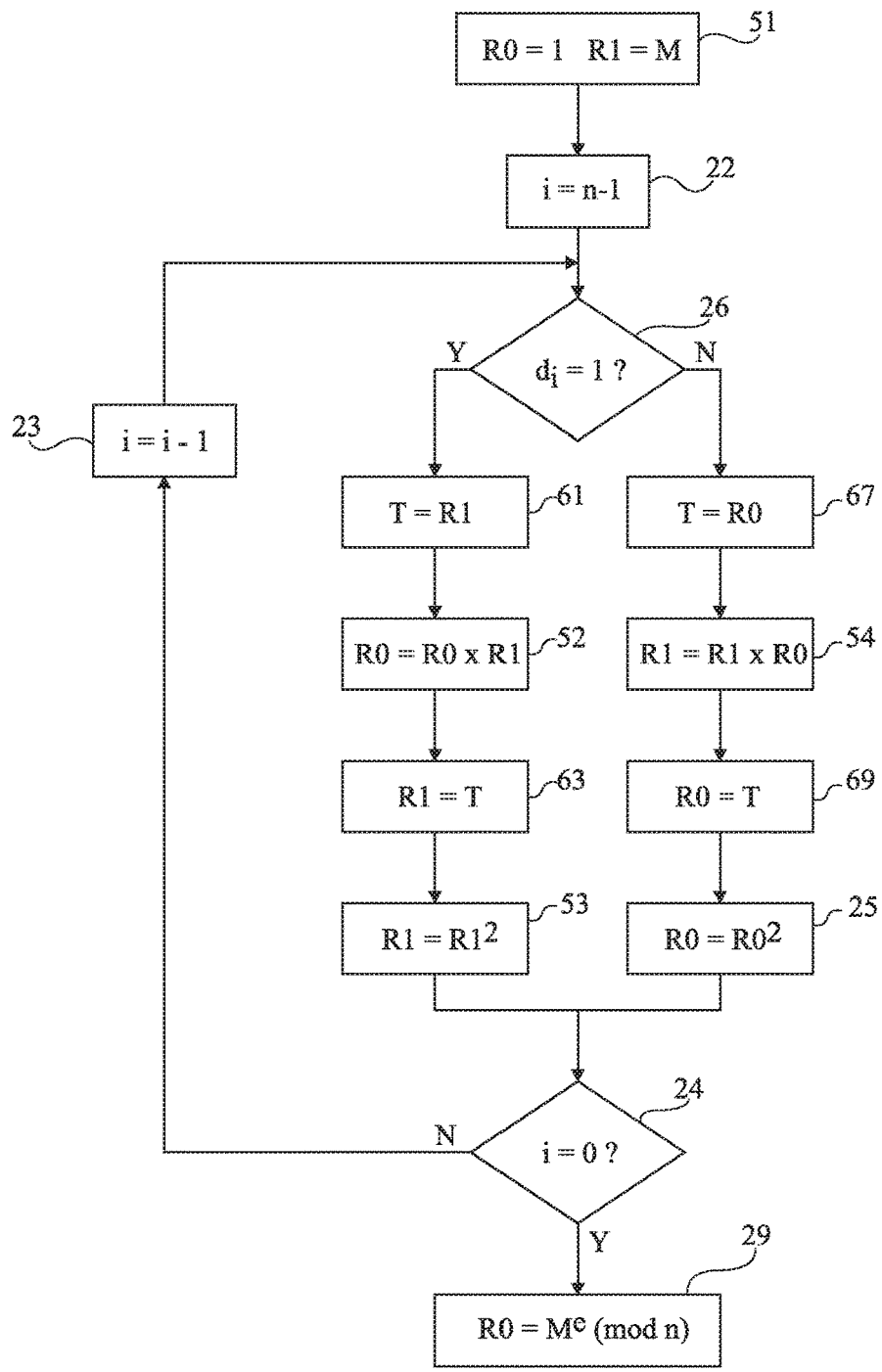
FIG. 6 is a block diagram illustrating an embodiment of a method of protecting a modular exponentiation calculation, carried out in a Montgomery ladder.

FIG. 6 is a block diagram illustrating an embodiment of a method of protecting a modular exponentiation calculation, based on a calculation implementing the so-called "Montgomery ladder" method.

According to this method, an additional register 2, noted T, is used as a variable all along the calculation.

At a first step (block 51, R0=1; R1=M), registers R0 and R1 are for example initialized respectively with values 1 and M. Actually, it is sufficient to store the last word of the register which will be multiplied. The initial value contained in register T is of no importance.

A loop calculation on the bits of exponent e is then started. For example, a counter i is initialized at n−1 (block 22, i=n−1) and is decremented by 1 (block 23, i=i−1) each time a bit $d_i$ of the exponent is processed as long as not all the bits have been processed (block 24, i=0?).

For each iteration, a test is performed (block 26, $d_i$=1?) on the value of the exponent bit.

If current bit $d_i$ is 1 (output Y of block 26), the content of register R1 (resulting from the previous iteration) is transferred into register T (block 61, T=R1). This amounts to temporarily storing into register T the content of register R1 resulting from the previous operation. Then, the content of register R0 is multiplied by the content of register R1 (block 52, R0=R0*R1) and the result is placed in register R0. Then, the content of register T is restored to register R1 (block 63, R1=T). Then (block 53, R1=R1$^2$), the content of register R1 is squared and the result is placed in register R1.

If, conversely, current bit $d_i$ is 0 (output N of block 26), the content of register R0 (resulting from the previous iteration) is transferred into register T (block 67, T=R0). This amounts to temporarily storing into register T the content of register R0 resulting from the previous operation. Then, the content of register R1 is multiplied by the content of register R0 (block 54, R1=R1*R0) and the result is placed in register R1. Then, the content of register T is restored to register R0 (block 69, R0=T). Then (block 25, R0=R0$^2$), the content of register R0 is squared and the result is placed in register R0.

At the end (block 29), register R0 contains the final result of the modular exponentiation, that is, R0=M$^e$ (mod n).

Thus, even if an attack is performed on register R0 (or R1) within step 52 or 54, at the last iteration of step 43 (FIG. 4), the fact of using temporary register T and of reloading register R0 (or R1) before the squaring operation makes such an attack inoperative.

The method described in relation with FIG. 6 amounts to executing the following calculation:
R0=1 (block 51)
R1=M (block 51)
For i=n−1 to 0 (block 22, output N of block 24, block 23):
  If $d_i$=1 (output Y of block 26)
    T=R1 (block 61)
    R0=R0*R1 (block 52)
    R1=T (block 63)
    R1=R1$^2$ (block 53)
  Otherwise (output N of block 26)
    T=R0 (block 67)
    R1=R1*R0 (block 54)
    R0=T (block 69)
    R0=R0$^2$ (block 25)
End of loop (output Y of block 24)
Return to R0 (block 29).

In an embodiment, the resistance of an electronic circuit to an attack such as described hereabove is desired to be evaluated. For this purpose, the attack may be executed and it is detected whether or not it is efficient.

In an embodiment, the execution of a modular exponentiation calculation is desired to be protected against such an attack. The implementation of the method of verifying the sensitivity to the attack may facilitate verifying whether an embodiment of the countermeasure described in relation with FIG. 6 is implemented or not by the electronic circuit.

Various embodiments have been described. Various alterations and modifications will occur to those skilled in the art. In particular, the register denomination is arbitrary and may be inverted. Finally, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
verifying a sensitivity of an electronic circuit executing a modular exponentiation calculation using a first register and a second register, wherein:
the executing the modular exponentiation calculation includes, successively for each bit of an exponent of the calculation:
multiplying content of one of the registers, selected from among the first register and the second register according to a state of a current bit of the exponent, by content of the other one of the first and second registers, and placing a result of the multiplication in said one of the first and second registers; and
squaring content of said other one of the first and second registers and placing a result of the squaring in the other of the first and second registers; and
the verifying includes:
disturbing, for each bit of the exponent of the calculation, content of at least one of the first and second registers during the multiplying; and
determining the sensitivity of the electronic circuit based on disturbed results of the modular exponentiation calculation.

2. The method of claim 1 wherein the multiplying is implemented using a Montgomery ladder.

3. The method of claim 1 wherein the verifying includes disturbing content of the first register before each multiplication of the multiplying.

4. The method of claim 1 wherein a result of the modular exponentiation is contained in said first register.

5. The method of claim 1 wherein the electronic circuit is considered as sensitive to a fault injection if the results of the calculation differ between a plurality of executions of the calculation with the same operands.

6. The method of claim 1 wherein the executing the modular exponentiation calculation includes:
initializing the first register to value 1;
initializing the second register to a value of a number to be submitted to the modular exponentiation;
successively for each bit of the exponent;
if the state of the current bit of the exponent is 1:
multiplying content of the first register by that of the second register and storing the result of the multiplying in the first register;
squaring content of the second register and storing the result of the squaring in the second register; and
if the state of the current bit of the exponent is 0:
multiplying content of the second register by that of the first register and storing the result of the multiplying in the second register;
squaring content of the first register and storing the result of the squaring in the first register; and
outputting the content of the first register when all the bits of the exponent have been processed.

7. The method of claim 6 wherein the disturbance is, whatever the state of the bit of the exponent, carried out in the multiplication step.

8. The method of claim 1 wherein the modular exponentiation is implemented in a RSA algorithm.

9. The method of claim 1 wherein the disturbing content of at least one of the first and second registers during the multiplying comprises disturbing a register storing a multiplier of the multiplying.

10. An apparatus, comprising:
an interface configured to couple to a cryptographic circuit including first and second registers; and
control circuitry coupled to the interface, wherein, in operation, the control circuitry:
generates signals to cause the cryptographic circuit to execute a modular exponentiation calculation, the executing the modular exponentiation calculation including, successively for each bit of an exponent of the calculation:
multiplying content of one of the first and second registers, selected from among the first register and the second register according to a state of a current bit of the exponent, by content of the other one of the first and second registers, and placing a result of the multiplication in said one of the first and second registers; and
squaring content of said other one of the first and second registers and placing a result of the squaring in the other of the first and second registers; and
generates signals to disturb, for each bit of the exponent of the calculation, content of at least one of the first and second registers during the multiplying of the modular exponentiation calculation.

11. The apparatus of claim 10 wherein the control circuitry, in operation, extracts at least one bit of the exponent of the calculation based on results of the disturbed modular exponentiation calculation.

12. The apparatus of claim 10 wherein the disturbing comprises a fault injection attack.

13. The apparatus of claim 10 wherein the control circuitry, in operation, verifies a sensitivity of the cryptographic circuit to fault injection attacks based on results of the disturbed modular exponentiation calculation.

14. The apparatus of claim 13 wherein the cryptographic circuit is considered as sensitive to a fault injection if the results of the calculation differ between a plurality of executions of the calculation with the same operands.

15. The apparatus of claim 10 wherein the multiplying is implemented using a Montgomery ladder.

16. The apparatus of claim 10 wherein the disturbing includes disturbing content of the first register before each multiplication of the multiplying.

17. The apparatus of claim 10 wherein a result of the modular exponentiation is contained in said first register.

18. The apparatus of claim 10 wherein the executing the modular exponentiation calculation includes:
- initializing the first register to value 1;
- initializing the second register to a value of a number to be submitted to the modular exponentiation;
- successively for each bit of the exponent;
    - if the state of the current bit of the exponent is 1:
        - multiplying content of the first register by that of the second register and storing the result of the multiplying in the first register;
        - squaring content of the second register and storing the result of the squaring in the second register; and
    - if the state of the current bit of the exponent is 0:
        - multiplying content of the second register by that of the first register and storing the result of the multiplying in the second register;
        - squaring content of the first register and storing the result of the squaring in the first register; and
- outputting the content of the first register when all the bits of the exponent have been processed.

19. The apparatus of claim 10 wherein the modular exponentiation is implemented in a RSA algorithm.

20. The apparatus of claim 10 wherein the disturbing content of at least one of the first and second registers during the multiplying comprises disturbing a register of the first and second registers storing a multiplier of the multiplying.

21. A method, comprising:
- executing, using a cryptographic circuit including first and second registers, a modular exponentiation calculation, the executing the modular exponentiation calculation including, successively for each bit of an exponent of the calculation:
    - multiplying content of one of the first and second registers, selected from among the first register and the second register according to a state of a current bit of the exponent, by content of the other one of the first and second registers, and placing a result of the multiplication in said one of the first and second registers; and
    - squaring content of said other one of the first and second registers and placing a result of the squaring in the other of the first and second registers; and
- injecting, for each bit of the exponent of the calculation, a fault into content of at least one of the first and second registers during the multiplying of the modular exponentiation calculation.

22. The method of claim 21, comprising extracting at least one bit of the exponent of the calculation based on results of the modular exponentiation calculation.

23. The method of claim 21, comprising verifying a sensitivity of the cryptographic circuit to fault injection attacks based on results of the modular exponentiation calculation.

24. The method of claim 21 wherein the injecting a fault includes disturbing content of the first register before each multiplication of the multiplying.

25. The method of claim 21 wherein the injecting a fault comprises disturbing a register of the first and second registers storing a multiplier of the multiplying.

* * * * *